United States Patent [19]

Bäbler

[11] 4,238,386
[45] Dec. 9, 1980

[54] PROCESS FOR THE MASS PIGMENTING OF RIGID POLYVINYL CHLORIDE AND POLYOLEFINS

[75] Inventor: Fridolin Bäbler, Allschwil, Switzerland

[73] Assignee: Ciba-Geigy Corporation, Ardsley, N.Y.

[21] Appl. No.: 37,799

[22] Filed: May 10, 1979

[30] Foreign Application Priority Data

May 18, 1978 [CH] Switzerland ............ 5388/78

[51] Int. Cl.³ ................................ C08K 5/34
[52] U.S. Cl. ................................ 260/42.21
[58] Field of Search ...................... 260/42.21

[56] References Cited

U.S. PATENT DOCUMENTS

| 2,890,220 | 6/1959 | Eckert et al. | 260/42.21 X |
| 4,018,791 | 4/1971 | Spietschka | 260/42.21 X |

FOREIGN PATENT DOCUMENTS 1130099  5/1962  Fed. Rep. of Germany.
1523475  8/1978  United Kingdom.

Primary Examiner—Sandra M. Person
Attorney, Agent, or Firm—Harry Falber

[57] ABSTRACT

A process for pigmenting polyolefins and rigid polyvinyl chloride, which comprises the use of perylenetetracarboxylic acid diimide pigments of the formula

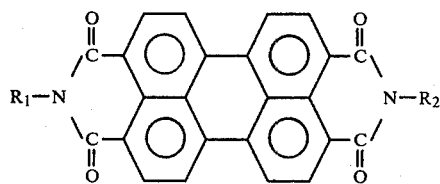

wherein $R_1$ represents an aliphatic or cycloaliphatic radical of at least 12 carbon atoms and $R_2$ represents hydrogen or an aliphatic or cycloaliphatic radical. These pigments are exceptionally suitable for pigmenting polyolefins and rigid polyvinyl chloride.

7 Claims, No Drawings

PROCESS FOR THE MASS PIGMENTING OF RIGID POLYVINYL CHLORIDE AND POLYOLEFINS

It is known that N,N'-dimethylperylene-3,4,9,10-tetracarboxylic acid diimide can be used, inter alia, for pigmenting polyolefins (see e.g. German Auslegeschrift 2 504 481). This pigment, however, has very poor dispersibility and is therefore of no practical interest for the envisaged end use.

On the other hand, German patent specification 1 130 099 discloses that N,N'-dialkylperylene-3,4,9,10-tetracarboxylic acid diimides containing alkyl redicals of 3 to 18 carbon atoms are suitable for producing fluorescent colourations in polystyrene. Furthermore, it is stated that these colourants do not have any substantial resistance to solvents, which rules out their use as pigments in the lacquer or plastics sector.

The present invention is based on the surprising observation that perylenetetracarboxylic acid diimides, or mixtures thereof, of the formula

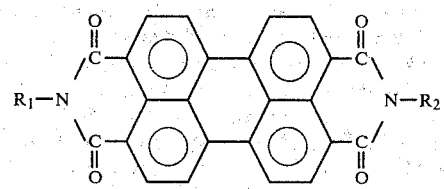

wherein $R_1$ represents an aliphatic or cycloaliphatic radical containing at least 12 carbon atoms and $R_2$ represents hydrogen or an aliphatic or cycloaliphatic radical and has the same meaning as $R_1$ or is different, are exceptionally suitable for pigmenting polyolefins and rigid PVC.

As has been already mentioned, the eligible pigments of the present invention are described in German patent specification 1 130 099. They are obtained by known methods by condensing perylene-3,4,9,10-tetracarboxylic acid or the anhydride thereof with an aliphatic amine of the formula $R_1NH_2$, wherein $R_1$ has the above meaning but preferably repesents an alkyl, alkoxylakyl or cycloalkyl radical of 12 to 24 carbon atoms, or with a mixture of an amine of the formula $R_1NH_2$ and an amine of the formula $R_2NH_2$ and, optionally, with further amines of the formula $R_2NH_2$, wherein $R_2$ has the above meaning but preferably represents an alkyl radical of 1 to 24 carbon atoms, a alkoxyalkyl radical of 3 to 24 carbon atoms or a cycloalkyl radical of 5 to 24 carbon atoms.

When the amount of amines, based on the radicals $R_1$ and $R_2$, required for obtaining the diimides to be used in this invention is 100 mol.%, pigments which can be readily dispersed in rigid PVC and polyolefins are obtained by starting preferably from 2-95 mol.% of $R_1$, depending on the nature of $R_2$. If $R_2$ is hydrogen, an alkyl radical of 1 to 10 carbon atoms, an alkoxyalkyl radical of 3 to 10 carbon atoms or a cycloalkyl radical of 5 to 10 carbon atoms, the amount of starting amine is preferably such that it contains 40-95 mol.% of $R_1$, based on 100 mol.% of the radicals $R_1$ and $R_2$. If $R_2$ is an alkyl, alkoxyalkyl or cycloalkyl radical of 10 to 24 carbon atoms, the amount of amine employed is preferably such that it contains 2-60 mol.% of $R_1$.

Mixtures of amines in which $R_1$ is stearyl and $R_2$ is branched alkyl, alkoxyalkyl or cycloalkyl of 6 to 12 carbon atoms, are especially suitable.

Of the pigments obtained according to the invention, the co-condensation pigments ($R_1 \neq R_2$) have in general an even better resistance to blooming at higher temperatures compared with the pure condensation pigments ($R_1 = R_2$).

Examples of amines of the formula $R_1$-$NH_2$ are: laurylamine, stearylamine, myristylamine, cetylamine, 3-(n-dodecyloxy)-n-propylamine-1, the amine of the formula

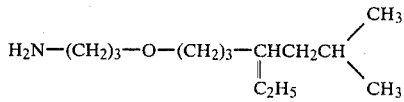

and abietylamine, di- or tetrahydroabietylamine or dehydroabietylamine, and also the amines of the formula

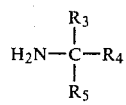

which are known under the registered tradenames Primene 81-R ($R_3$, $R_4$ and $R_5$ containing together 12 to 14 carbon atoms) and Primene JM-T ($R_3$, $R_4$ and $R_5$ containing together 18 to 22 carbon atoms).

In addition to the amines referred to above, suitable amines of the formula $R_2NH_2$ are also e.g.: ammonia, methylamine, ethylamine, n-propylamine, isopropylamine, n-butylamine, isobutylamine, tert-butylamine, 1-methylpropylamine, n-pentylamine, n-hexylamine, 1,3-dimethyl-n-butylamine-1,1-amino-2-methyl-n-pentane, 1-amino-2-ethylhexane, 3-methoxy-n-propylamine-1, 3-isopropoxy-n-propylamine-1, cyclohexylamine, n-octylamine, tert-octylamine, 1-amino-3-ethyl-5-methylhexane, 3-n-hexoxy-n-propylamine-1, 3-cyclohexoxy-n-propylamine-1, 3-(2'-ethylhexoxy)-n-propylamine-1.

The reaction of the perylenetetracarboxylic dianhydride with the long chain amine is carried out advantageously in water, aqueous ammonia or aqueous methylamine under pressure or in an organic solvent or diluent, such as ligroin, quinoline, ethylene glycol, cellosolve, ethyl cellosolve, trichlorobenzene, alcohols, for example methanol, ethanol, propanol-1, propanol-2, with or without elevated pressure, or in an excess of the amine with or without additional solvent. To obtain asymmetrical diimides containing a methyl imide group, the use of N-methylformamide is particularly suitable, as, in addition to its function as solvent, it acts simultaneously as methylamine donor.

The resulting pigments can be isolated by filtration, dried by conventional methods, and, because of their excellent dispersibility, can be incorporated direct in polyolefins or rigid PVC without further comminution or conditioning.

Examples of polyolefins are polyethylene of high and low density, polypropylene and polyisobutylene.

Colouration is effected by the conventional methods, for example by mixing the pigment with the polyolefin granulate or powder and extruding the mixture to filaments, sheets or granulated. The latter can then be moulded to articles by injection moulding.

The reddish violet colourations obtained are distinguished by good fastness properties, especially resistance to heat and fastness to light and blooming. A particular advantage of the articles pigmented according to the invention consists in the fact that they exhibit no tendency to distortion and deformation, especially in the case of high density polyethylene.

Because of their good fastness properties, mouldings of rigid PVC coloured according to the invention are of particular interest for structural parts employed in the building sector, such as cladding panels, door frames, window frames and louver boards.

In the following Examples the parts and percentages are by weight unless otherwise indicated. The perylene-3,4,9,10-tetracarboxylic acid-N,N'-bis-imide pigments are referred to as perylene diimide pigments.

EXAMPLE 1

With stirring, 15.8 parts of perylene-3,4,9,10-tetracarboxylic anhydride are added at a temperature of about 80°–85° C. to 107.6 parts of fused stearylamine. After stirring for 10 minutes, the barely stirrable mass is diluted with 400 parts of ligroin (b.p. 130°–150° C.) and stirred for a further 17 hours at reflux temperature. The suspension is filtered at about 80° C. and the filter cake is well washed with ligroin. To remove all excess stearylamine, the filter cake is stirred in 300 parts by volume of methanol for 1 hour at about 40° C. After filtration, the filter cake is washed with methanol and dried, yielding 33.3 parts of perylenetetracarboxylic acid bis-(stearylimide). When incorporated in high density polyethylene by injection moulding, this pigment produces strong reddish violet shades of excellent fastness properties. In addition, the coloured articles are free from distortion.

EXAMPLE 2

With stirring, 19.8 parts of perylenetetracarboxylic dianhydride are added at a temperature of about 80° C. to 56 parts of fused laurylamine. The resulting barely stirrable mass is stirred for 10 minutes at about 80° C., diluted with 300 parts by volume of ligroin and heated to reflux temperature. The water of reaction is slowly distilled off from the reaction vessel in the course of 3 hours at reflux temperature. The reaction mass is diluted with a further 50 parts by volume of ligroin and stirred for a further 17 hours at reflux temperature. The suspension is then filtered at about 80° C. The filter cake is washed free of amine with ligroin, then with methanol and dried, yielding 36 parts of perylenetetracarboxylic acid bis-(laurylamide). In the melt spinning colouration of polypropylene fibres, this pigment produces strong reddish violet shades of excellent lightfastness and textile properties.

EXAMPLE 3

5.4 parts of stearylamine, 3.7 parts of laurylamine, and 7.9 parts of perylenetetracarboxylic dianhydride are stirred for 17 hours at 150°–160° C. in 100 parts of N-methylformamide. The suspension is filtered at about 40° C. and the filter cake is washed well with methanol and dried, yielding 15.1 parts of perylene diimide pigment. When incorporated in high density polyethylene by injection moulding, this pigment produces strong reddish violet colourations of excellent heat resistance and excellent lightfastness. In addition, the coloured articles are free from distortion.

EXAMPLE 4

A perylene diimide pigment having equally good properties is obtained by repeating the procedure of Example 3, but using 0.55 parts of stearylamine and 7 parts of laurylamine.

EXAMPLE 5

A perylene diimide pigment having equally good properties is obtained by repeating the procedure of Example 3, but using as primary aliphatic amine 5.4 parts of stearylamine and 3.3 parts by volume of octylamine.

EXAMPLE 6

A perylene diimide pigment having equally good properties is obtained by repeating the procedure of Example 3, but using as primary aliphatic amine a mixture consisting of 5.4 parts of stearylamine, 2 parts of laurylamine and 2 parts by volume of hexylamine.

EXAMPLE 7

7.9 parts of perylenetetracarboxylic dianhydride, 7.3 parts of laurylamine, 0.8 part of stearylamine, 150 parts by volume of 2% aqueous ammonia, and 10 parts by volume of isopropanol are stirred for in an autoclave for 24 hours at 100° C. The suspension is filtered at about 50° C. and the filter cake is washed well with methanol and dried, yielding 15 parts of perylene diimide pigment. When incorporated in high density polyethylene, this pigment produces distortion-free, strong claret shades of excellent fastness properties.

EXAMPLE 8

7.9 parts of perylene-3,4,9,10-tetracarboxylic dianhydride, 5.8 parts of laurylamine, and 2.4 parts of stearylamine are stirred in a 2% aqueous methylamine solution in an autoclave for 8 hours. The suspension is filtered and the filter cake is washed well with methanol and dried, yielding 15.2 parts of perylene diimide pigment. When incorporated in high density polyethylene, this pigment produces strong, distortion-free claret shades of excellent fastness properties.

EXAMPLE 9

7.9 parts of perylenetetracarboxylic dianhydride, 5.4 parts of stearylamine and 2.8 parts by volume of 3-(2'-ethylhexoxy)-n-propylamine-1 are stirred in 100 parts by volume of N-methylformamide for 17 hours at 155°–160° C. The suspension is filtered at about 40° C. and the filter cake is washed well with methanol and dried, yielding 14.8 parts of perylene diimide pigment. When incorporated in high density polyethylene by injection moulding, this pigment produces strong reddish violet colourations of excellent lightfastness. In addition, the coloured mouldings are distortion-free.

EXAMPLE 10

A perylene diimide pigment having equally good properties is obtained by repeating the procedure of Example 9, but using 9.7 parts of stearylamine and 0.6 parts by volume of 2-(2'-ethylhexoxy)-n-propylamine-1.

EXAMPLE 11

7.9 parts of perylenetetracarboxylic dianhydride, 7.3 parts of laurylamine and 0.8 part of stearylamine are stirred in 100 parts of water at 120° C. in an autoclave. The suspension is filtered at about 40° C. and the filter cake is washed well with methanol and dried, yielding 15.6 parts of perylene diimide pigment. Without further processing, this pigment can be incorporated in polyolefins by the melt spinning process and produces strong reddish violet colourations of excellent fastness properties.

EXAMPLE 12

7.9 parts of perylenetetracarboxylic dianhydride, 9.8 parts of stearylamine and 0.8 part of 3-(2'-ethylhexoxy)-n-propylamine-1 are stirred in 100 parts by volume of methanol for 20 hours at 150°–160° C. in an autoclave. The suspension is filtered at room temperature and the filter cake is washed with methanol until the washings run colourless and then dried, yielding 15.8 parts of perylene diimide pigment. When incorporated in high density polyethylene by injection moulding, this pigment produces reddish violet colourations of excellent heat resistance and excellent lightfastness. In addition, the coloured mouldings are free from distortion.

EXAMPLE 13

A mixture of 1 part of the perylene diimide pigment of Example 9, 1 part of antioxidant IRGANOX 1010 (registered trademark of CIBA-GEIGY AG) and 1000 parts of high density polyethylene granulate VESTOLAN A-60-16 (registered trademark of Hüls) is premixed for 15 minutes in a 3 liter glass flask on a Röhnrad mixer. The mixture is subsequently extruded twice in a single screw extruder and the resulting granulate is moulded to boards at 220° C. in an Allround Aarburg 200 injection moulding machine and the boards are after-pressed for 5 minutes at 180° C. The boards are coloured in strong reddish violet shades and are just as distortion-free as the moulded articles made from uncoloured VESTOLAN A-60-16. On storing the boards for 24 hours in an oven at 80° C., no blooming of the pigment from the plastic can be observed.

EXAMPLE 14

A mixture consisting of 92 parts of vinyl resin VINNOL H65D (Wacker, Munich), 8 parts of vinyl copolymer VESTOLIT HIS 7587 (Hüls), 1.5 parts of plasticiser REOPLAST 39 (CIBA-GEIGY AG), 1.4 parts of stabiliser IRGASTAB BC-10 (CIBA-GEIGY AG), 1.4 parts of stabiliser IRGASTAB BC-29 (CIBA-GEIGY AG), 0.7 part of auxiliary stabiliser IRGASTAB CH-300 (CIBA-GEIGY AG), 0.4 part of lubricant IRGAWAX 370 (CIBA-GEIGY AG), 0.2 part of lubricant IRGAWAX 360 (CIBA-GEIGY AG) and 0.25 part of UV absorber TINUVIN 320 (CIBA-GEIGY AG), is prepared in a fluid mixer (Papenmeier K.G., Detmold) by stirring for about 5 minutes at a speed of about 1400 rpm.

1.5 part of the rigid PVC compound so obtained and 0.075 part of a perylene diimide pigment of any one of Examples 1 to 11 are mixed at room temperature for about 3 minutes in a Henschel mixer (Henschel GmbH, Kassel) at a speed of about 2000 rpm. The pigmented rigid PVC compound is rolled on a roll mill at 190° C. for 6 minutes at 25 rpm and a friction of 1:1.2, and pressed at 190° C. for 6 minutes on a Bürkle press between chromium-plated steel plates to a thickness of about 1 mm. The resulting reddish violet moulding has excellent lightfastness and resistance to atmospheric influences on exposure.

EXAMPLE 15

1000 parts of polypropylene granulate and 10 parts of the perylene diimide pigment of Example 10 are thoroughly mixed in a mixer drum. The treated granulate is spun at 280°–285° C. by the melting spinning process to reddish violet filaments with excellent lightfastness and textile properties.

What is claimed is:

1. A process for pigmenting a polyolefin or a rigid polyvinyl chloride which comprises initimately mixing with the polyolefin or the rigid polyvinyl chloride a perylenetetracarboxylic acid diimide pigment, or a mixture of said pigments of the formula

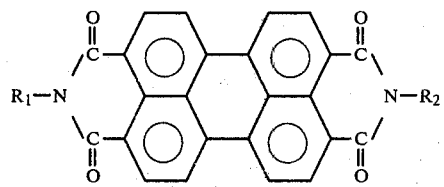

wherein $R_1$ represents an alkyl, alkoxyalkyl or cycloalkyl radical of 12 to 24 carbon atoms and $R_2$ represents hydrogen, an alkyl radical of 1 to 24 carbon atoms, an alkoxyalkyl radical of 3 to 24 carbon atoms or a cycloalkyl radical of 5 to 24 carbon atoms.

2. A process according to claim 1, wherein the perylenetracarboxylic acid diimide, or a mixture thereof, contains 40 to 95 mol.% of the radical $R_1$, based on 100 mol.% of the radicals $R_1$ and $R_2$, and $R_2$ represents an alkyl radical of 1 to 10 carbon atoms, an alkoxyalkyl radical of 3 to 10 carbon atoms or a cycloalkyl radical of 5 to 10 carbon atoms.

3. A process according to claim 1 wherein the perylenetetracarboxylic acid diimide, or a mixture thereof, contains 2 to 60 mol.% of the radical $R_1$, based on 100 mol.% of the radicals $R_1$ and $R_2$, and $R_2$ represents an alkyl, alkoxyalkyl or cycloalkyl radical of 10 to 24 carbon atoms.

4. A process according to claim 1 wherein the perylenetetracarboxylic acid diimide, or a mixture thereof, contains 2 to 60 mol.% of the radical $R_1$, based on 100 mol.% of the radicals $R_1$ and $R_2$, and $R_2$ represents a branched alkyl or a cycloalkyl radical of 8 to 24 carbon atoms.

5. A process according to claim 1 wherein $R_1$ represents a lauryl, stearyl or cetyl radical.

6. A process according to claim 1 wherein $R_2$ represents a methyl, 2-ethylhexyl, 3-isopropoxy-n-propyl, lauryl, 3-ethyl-5-methylhexyl, 3-(2'-ethylhexoxy)-n-propyl or cyclohexyl radical.

7. The pigmented polyolefins and rigid polyvinyl chloride compounds obtained according to the process of claim 1.

* * * * *